United States Patent
Ogura

(10) Patent No.: US 8,588,212 B2
(45) Date of Patent: Nov. 19, 2013

(54) IP TELEPHONE SYSTEM, NETWORK DEVICE, COMMUNICATION METHOD IN DISASTER SITUATIONS USED THEREFOR AND IP TELEPHONE TERMINAL

(75) Inventor: Naoto Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 1031 days.

(21) Appl. No.: 12/477,778

(22) Filed: Jun. 3, 2009

(65) Prior Publication Data

US 2009/0303986 A1 Dec. 10, 2009

(30) Foreign Application Priority Data

Jun. 4, 2008 (JP) .................................. 2008-146356

(51) Int. Cl.
*H04L 12/66* (2006.01)

(52) U.S. Cl.
USPC ........................................................ 370/352

(58) Field of Classification Search
None
See application file for complete search history.

(56) References Cited

U.S. PATENT DOCUMENTS

| | | | | |
|---|---|---|---|---|
| 2006/0079200 A1* | 4/2006 | Hirouchi et al. | ........... | 455/404.1 |
| 2006/0239424 A1* | 10/2006 | Walter | ........... | 379/88.22 |
| 2006/0274721 A1* | 12/2006 | Flanagan | ........... | 370/352 |
| 2008/0013526 A1* | 1/2008 | Nakai | ........... | 370/352 |
| 2008/0162560 A1* | 7/2008 | Bodin et al. | ........... | 707/104.1 |

FOREIGN PATENT DOCUMENTS

| | | |
|---|---|---|
| JP | 2006304028 A | 11/2006 |
| JP | 2007312299 A | 11/2007 |

* cited by examiner

*Primary Examiner* — Minh-Trang Nguyen

(57) ABSTRACT

An IP (Internet Protocol) telephone system according to the present invention is an IP telephone system including an IP telephone terminal communicating with an opposite party using SIP (Session Initiation Protocol), and a network device transferring a packet from the IP telephone terminal, wherein the IP telephone terminal includes a CPU (Central Processing Unit) transmitting an SIP packet indicating an e-mail address related to a telephone number of the opposite party when the terminal resides in a non-disaster area and calls the opposite party in a disaster area with a disaster mode being set, and the network device includes an SIP packet processing part terminating an SIP packet whose destination is an e-mail address, an e-mail creation part converting a voice packet of RTP (Real Time Protocol) from the IP telephone terminal into text data and creating an e-mail, and a packet transmitting part transmitting the e-mail to the opposite party.

10 Claims, 12 Drawing Sheets

IP TELEPHONE SYSTEM, NETWORK DEVICE, COMMUNICATION METHOD IN DISASTER SITUATIONS USED THEREFOR AND IP TELEPHONE TERMINAL

INCORPORATION BY REFERENCE

This application is based upon and claims the benefit of priority from Japanese patent applications No. 2008-146356, filed on Jun. 4, 2008, the disclosure of which is incorporated herein its entirety by reference.

BACKGROUND OF THE INVENTION

1. Field of the Invention

The present invention relates to an IP telephone system, a network device, a communication method in disaster situations used therefore and an IP telephone terminal, and more particularly, to a communication method in disaster situations in a system.

2. Description of the Related Art

As shown in FIG. 12, an IP telephone system related to the invention includes IP telephone terminals 31 and 35, network gateways 32 and 34, and an SIP (Session Initiation Protocol) server 33.

In the IP telephone system, in case a disaster strikes at a site where the IP telephone terminal 35 resides, the IP telephone terminal 31 in a non-disaster area requests a call from the SIP server 33 in order to communicate with the IP telephone terminal 35 in the disaster area.

In the disaster situations, the SIP server 33 significantly restricts ordinary calls in order to avoid network congestion and reserve resources for important communications. In other words, the SIP server 33 restricts the number of calls from non-disaster areas to a disaster area.

Patent Document 1 (Japanese Patent Laid-Open No. 2006-304028) proposes congestion control on a network in disaster situations. A technique described in the Patent Document 1 encodes and decodes voice packets at a compression rate in accordance with a congestion state in the network in the event of congestion.

Patent Document 2 (Japanese Patent Laid-Open No. 2007-312299) proposes a technique for securing communication means of notifying a confirmation of safety between user terminals. According to the technique described in the Patent Document 2, when a disaster notification server device receives disaster area information indicating a disaster area on occurrence of a disaster, the disaster notification server device obtains a notification-registered user information list relevant to location information of user terminals in the disaster area, and connects a call between user terminals using an SIP server based on the notification-registered user information list.

However, there is a problem in the IP telephone systems related to the invention that it becomes difficult to make contact without contact means other than the telephone because calls flood to ask after people's safety in disaster situations, ordinary calls are significantly restricted and it becomes difficult to establish a call.

According to the technique in the Patent Document 1, it also becomes difficult to establish a call when ordinary calls are significantly restricted. According to the technique in the Patent Document 2, it is not dissimilar in that calls from the user terminals residing in the non-disaster area are significantly restricted, because the technique assumes calls between the user terminals in an area where a disaster struck.

SUMMARY

An exemplary object of the invention is to resolve the above-mentioned problems and provide an IP telephone system, a network device, a communication method in disaster situations used therefore and an IP telephone terminal, which allow communication from a non-disaster area to a disaster area even under restriction of calls due to occurrence of a disaster.

An exemplary aspect of the invention is an IP (Internet Protocol) telephone system including an IP telephone terminal communicating with an opposite party using SIP (Session Initiation Protocol), and a network device transferring a packet from the IP telephone terminal, wherein the IP telephone terminal includes a CPU (Central Processing Unit) transmitting an SIP packet indicating an e-mail address related to a telephone number of the opposite party when the terminal resides in a non-disaster area and calls the opposite party in a disaster area with a disaster mode being set, and the network device includes an SIP packet processing part terminating an SIP packet whose destination is an e-mail address, an e-mail creation part converting a voice packet of RTP (Real Time Protocol) from the IP telephone terminal into text data and creating an e-mail, and a packet transmitting part transmitting the e-mail to the opposite party.

Another exemplary aspect of the invention is a network device transferring a packet from an IP (Internet Protocol) telephone terminal communicating with an opposite party using SIP (Session Initiation Protocol), including:

an SIP packet processing part terminating an SIP packet whose destination is an e-mail address; an e-mail creation part converting a voice packet of RTP (Real Time Protocol) from the IP telephone terminal into text data and creating an e-mail when the IP telephone terminal resides in a non-disaster area and a disaster mode is set; and a packet transmitting part transmitting the e-mail to the opposite party.

Still another exemplary aspect of the invention is a communication method in disaster situations used for an IP (Internet Protocol) telephone system including an IP telephone terminal communicating with an opposite party using SIP (Session Initiation Protocol), and a network device transferring a packet from the IP telephone terminal, wherein the IP telephone terminal transmits an SIP packet indicating an e-mail address related to a telephone number of the opposite party when the terminal resides in a non-disaster area and calls the opposite party in a disaster area with a disaster mode being set, and the network device terminates an SIP packet whose destination is an e-mail address, converts a voice packet of RTP (Real Time Protocol) from the IP telephone terminal into text data and creating an e-mail, and transmits the e-mail to the opposite party.

Still another exemplary aspect of the invention is an IP (Internet Protocol) telephone terminal communicating with an opposite party using SIP (Session Initiation Protocol), including a CPU (Central Processing Unit) transmitting to a network device an SIP packet indicating an e-mail address related to a telephone number of the opposite party when the terminal resides in a non-disaster area and calls the opposite party in a disaster area with a disaster mode being set, wherein in the network device, a voice packet from the terminal is converted into text data and an e-mail is created, and the e-mail is transferred to the e-mail address.

EXEMPLARY EMBODIMENT

Figure 1:
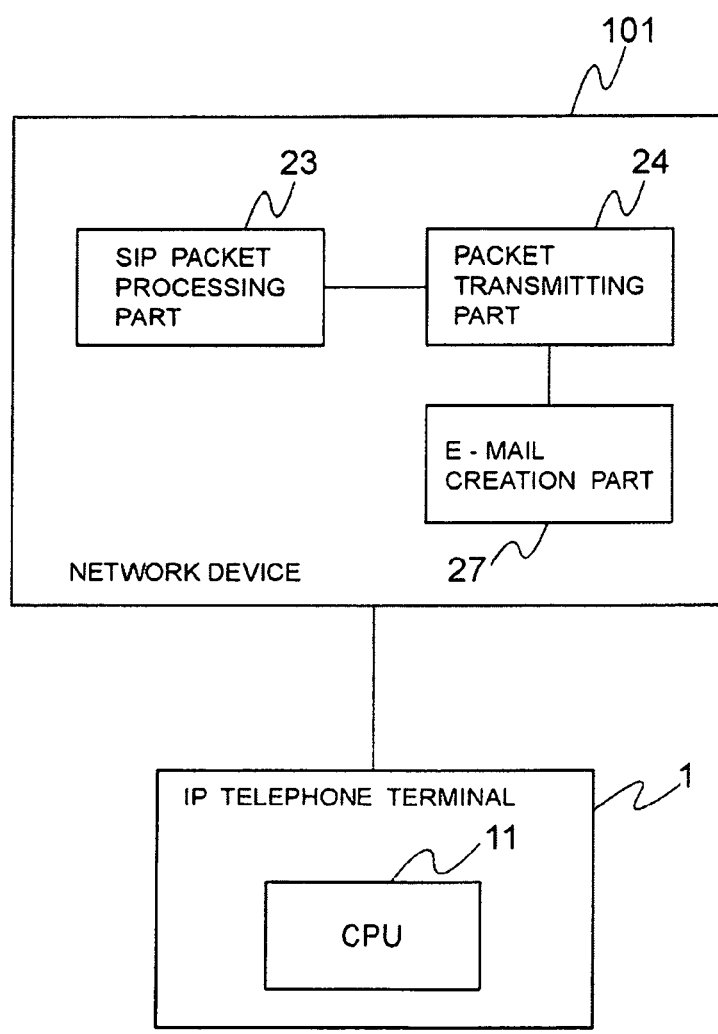
FIG. 1 is an explanatory diagram for explaining an operating principle of an IP telephone system according to the invention.

Before explanations on an exemplary embodiment of the invention, an operating principle of the invention will be described. FIG. 1 is an explanatory diagram for explaining the operating principle of an IP telephone system according to the invention. With reference to the figure, an example of the IP telephone system according to the invention includes an IP (Internet protocol) telephone terminal 1 which communicates with an opposite party using SIP (Session Initiation Protocol), and a network device 101 which transfers packets from the IP telephone terminal 1.

The IP telephone terminal 1 includes a CPU (Central Processing Unit) 11 which transmits an SIP packet indicating an e-mail address related to a telephone number of an opposite party when the terminal resides in a non-disaster area and calls the opposite party in a disaster area with a disaster mode being set.

The network device 101 includes an SIP packet processing part 23 which terminates an SIP packet whose destination is an e-mail address, an e-mail creation part 27 which converts a voice packet of RTP (Real Time Protocol) from the IP telephone terminal 1 into text data and creates an e-mail, and a packet transmitting part 24 which transmits the e-mail to the opposite party.

According to the present invention, with the above mentioned configuration and operation, an advantageous effect is produced which allows communication from the non-disaster area to the disaster area even in a state where the communication from the non-disaster area to the disaster area is restricted due to occurrence of a disaster.

Next, an exemplary embodiment of the invention will be described with reference to the drawings. First of all, an overview of the IP (Internet Protocol) telephone system according to the invention will be described.

In the IP telephone system according to the invention, the IP telephone terminal includes a telephone directory function, in which contact e-mail addresses for disaster situations are registered in relation to telephone numbers. Furthermore, in the IP telephone system according to the invention, a disaster notification server includes a function of putting the IP telephone terminal in a non-disaster area into the disaster mode by notifying the IP telephone terminal of transition to the disaster mode on occurrence of a disaster.

The IP telephone terminal includes a function of transmitting an SIP (Session initiation Protocol) packet which indicates the e-mail address registered together with the telephone number when the IP telephone terminal residing in a non-disaster area and being set in a disaster mode calls the disaster area.

The network gateway includes a function of analyzing the SIP packet from the IP telephone terminal and, when the destination is an e-mail address, transmitting the SIP packet to the media gateway.

The media gateway includes a function of terminating the SIP packet, and a function of converting a voice packet of the RTP (Real Time Protocol) into text data and transmitting the text data by e-mail.

The IP telephone system according to the invention is characterized by adopting the above-mentioned configuration to allow communication from the non-disaster area to the disaster area by, in the network device (gateway device) used for an edge of a network providing IP telephone service, executing voice-recognition on an ordinary call difficult to be established in disaster situations, converting the call into an e-mail, and transmitting the e-mail to an e-mail receiving terminal in the disaster area.

Figure 2:
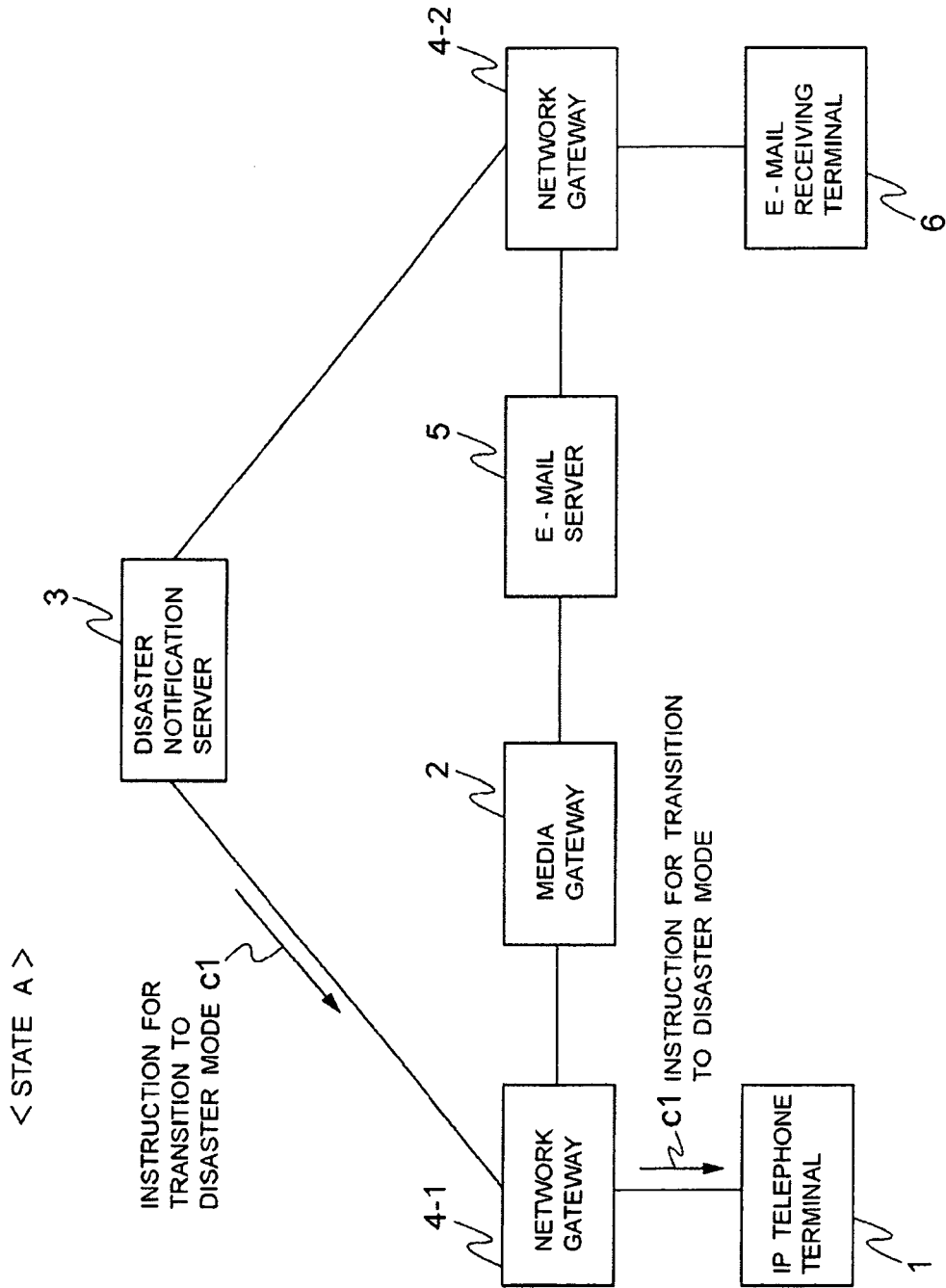
FIG. 2 is a block diagram showing the operation of the IP telephone system according to a first exemplary embodiment of the invention.

FIGS. 2 to 6 are block diagrams showing the operation of the IP telephone system according to a first exemplary embodiment of the invention. In FIG. 2, the IP telephone system according to the first exemplary embodiment of the invention includes an IP telephone terminal 1, a media gateway 2, a disaster notification server 3, network gateways 4-1 and 4-2, an e-mail server 5, and an e-mail receiving terminal 6.

The operation of the IP telephone system according to the first exemplary embodiment of the invention will hereinafter be described with reference to FIGS. 2 to 6.

The disaster notification server 3 transmits an instruction for transition to a disaster mode c1 to the IP telephone terminal 1 in a non-disaster area via the network gateway 4-1 on occurrence of a disaster (the state A in FIG. 2). When the IP telephone terminal 1 receives the instruction for transition to a disaster mode c1, the terminal causes itself to transition to the disaster mode. The IP telephone terminal 1 has a database (not shown) which stores relationships between specific telephone numbers and e-mail addresses for the disaster mode.

Figure 3:
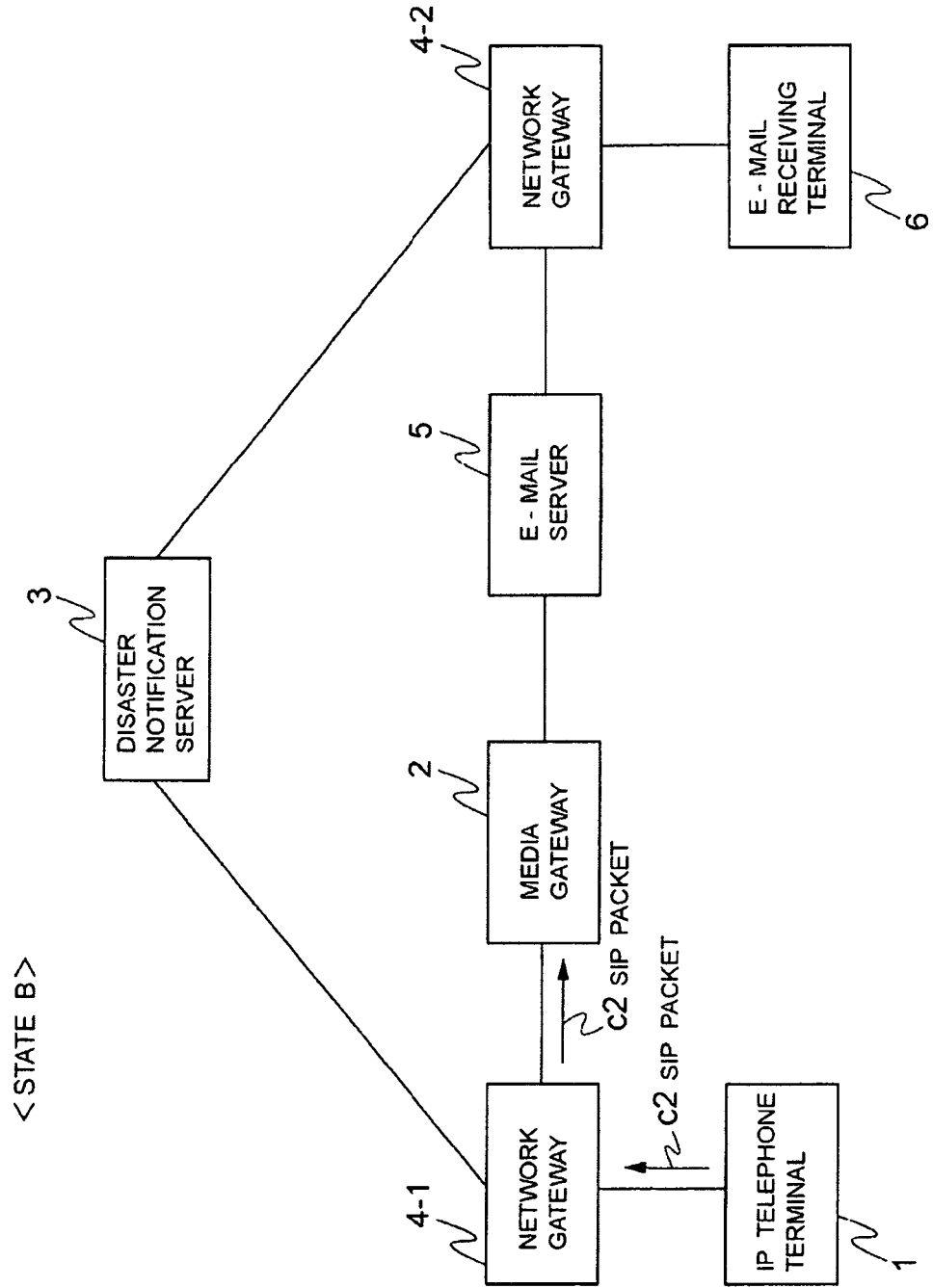
FIG. 3 is a block diagram showing the operation of the IP telephone system according to the first exemplary embodiment of the invention.

To initiates a call to the disaster area, the IP telephone terminal 1 in the non-disaster area transmits an SIP packet c2 indicating the e-mail address instead of the telephone number of an opposite party to the network gateway 4-1 (the state B in FIG. 3).

When the network gateway 4-1 recognizes the reception of the SIP packet c2 whose destination is the e-mail address, the network gateway 4-1 transfers the SIP packet c2 to the media gateway 2 which executes voice conversion (the state B in FIG. 3).

Figure 4:
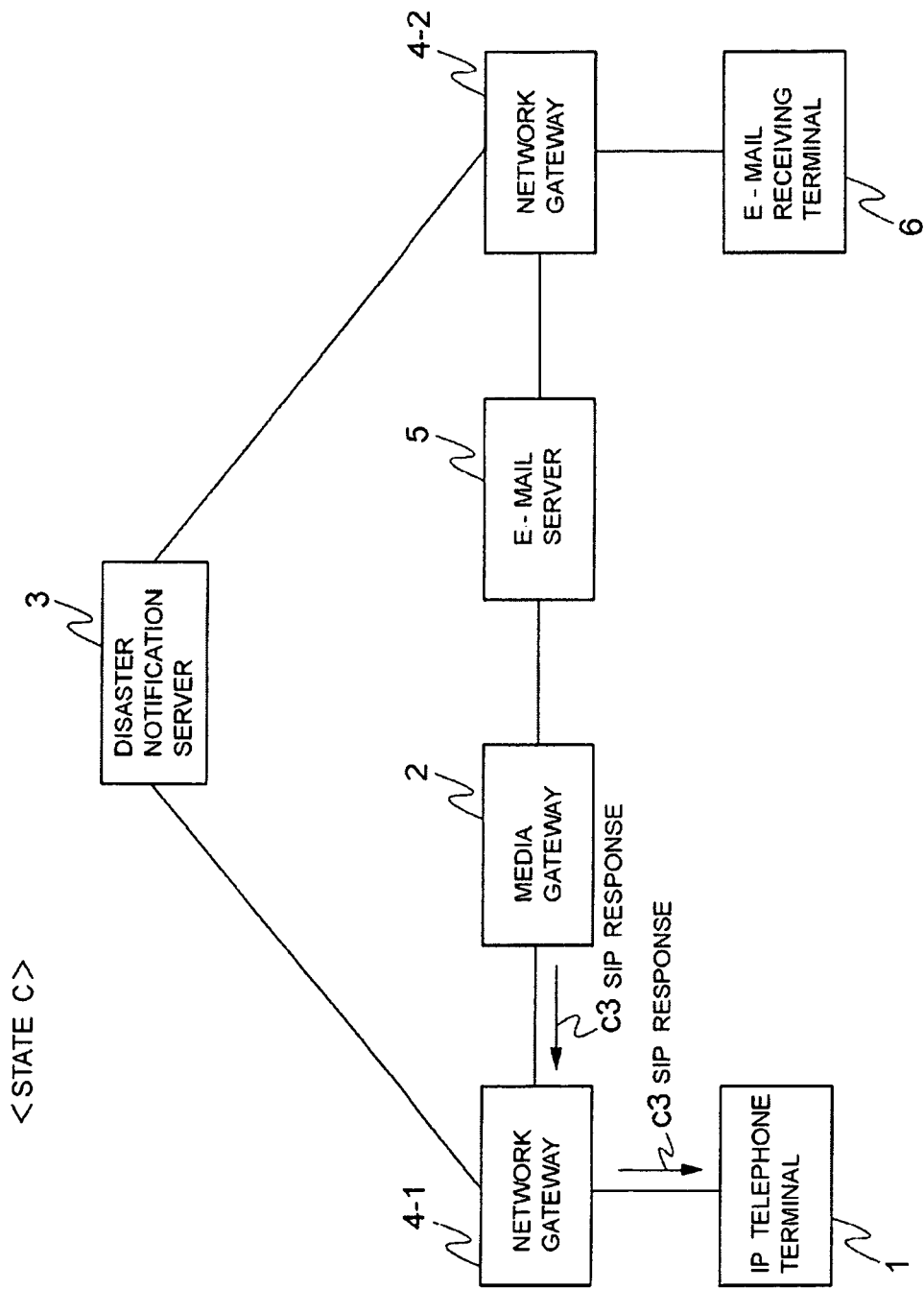
FIG. 4 is a block diagram showing the operation of the IP telephone system according to the first exemplary embodiment of the invention.

When the media gateway 2 receives the SIP packet c2, the media gateway 2 returns an SIP response c3 to the IP telephone terminal 1 via the network gateway 4-1, and establishes the call with the IP telephone terminal 1 (the state C in FIG. 4).

Figure 5:
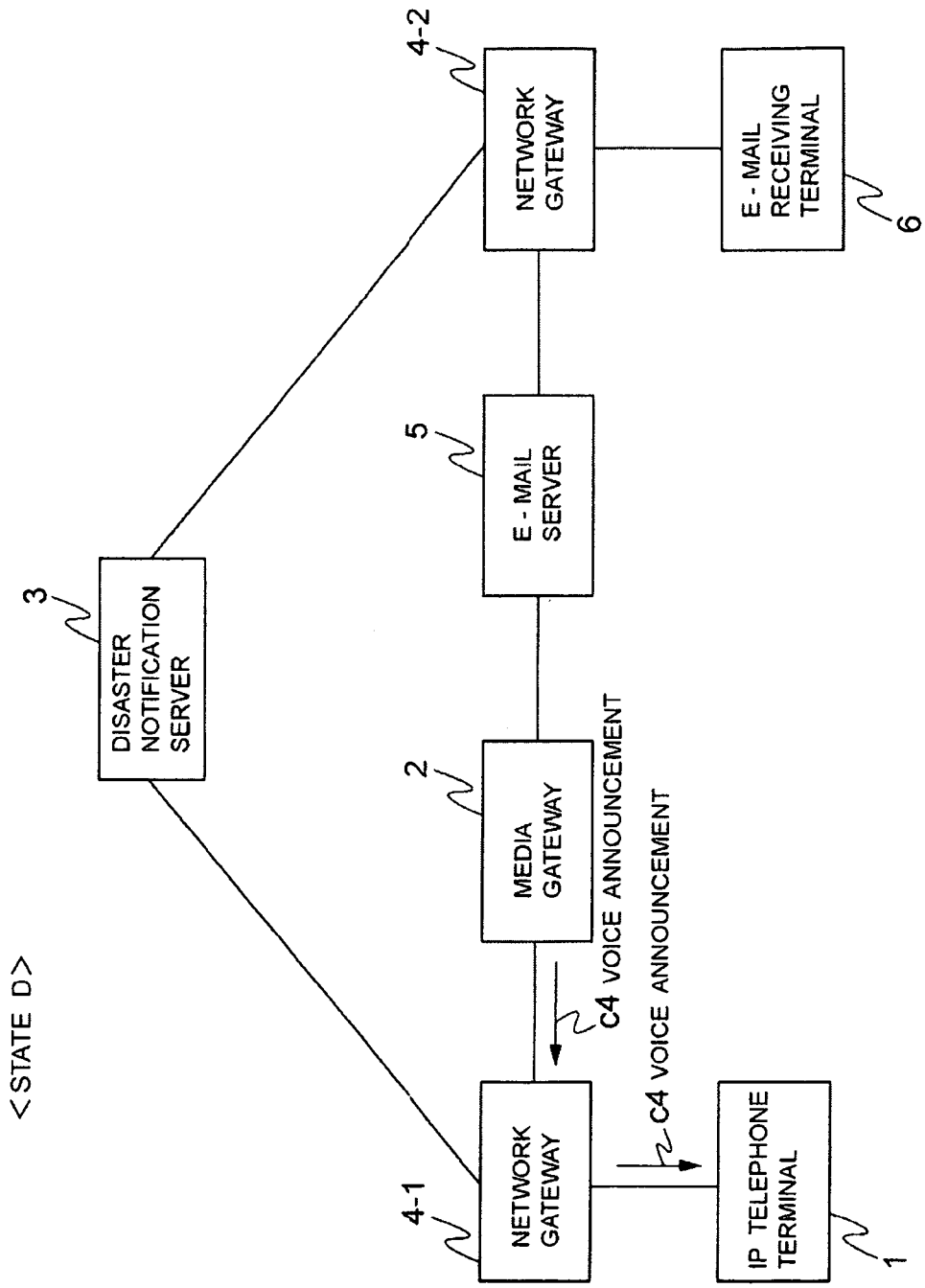
FIG. 5 is a block diagram showing the operation of the IP telephone system according to the first exemplary embodiment of the invention.

When the call with the IP telephone terminal 1 is established, the media gateway 2 transmits a voice announcement c4 via the network gateway 4-1 to the IP telephone terminal 1, thereby announcing to the user of the IP telephone terminal 1 that voice is automatically converted and transmitted by e-mail (the state D in FIG. 5).

Figure 6:
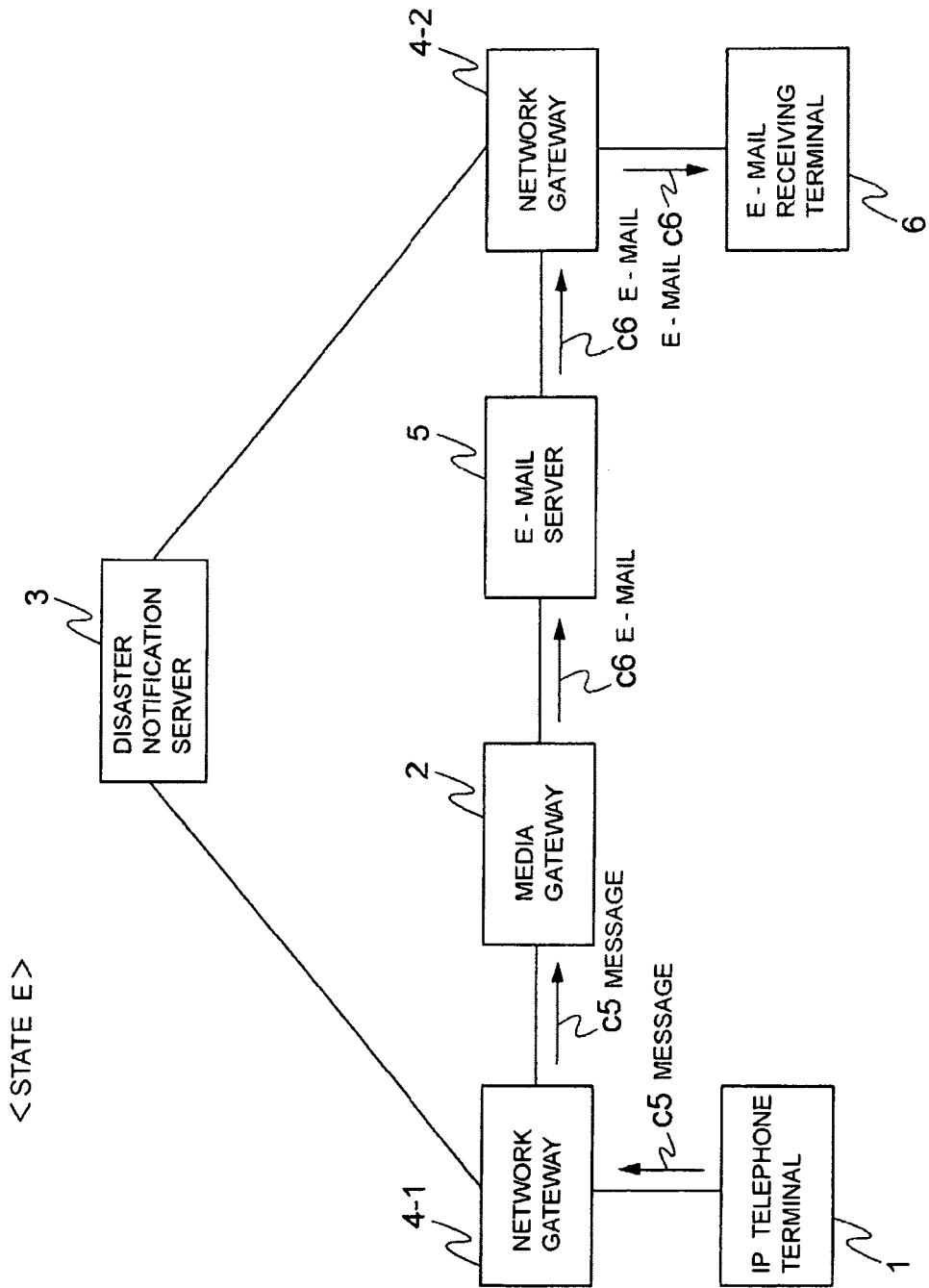
FIG. 6 is a block diagram showing the operation of the IP telephone system according to the first exemplary embodiment of the invention.

After receiving the voice announcement from the media gateway 2, the IP telephone terminal 1 transmits a message c5 as the RTP via the network gateway 4-1 to the media gateway 2 (the state E in FIG. 6).

When receiving the message c5, the media gateway 2 converts the voice data of the message c5 into text data, creates an e-mail c6, and transmits the e-mail c6 to the e-mail server 5. The e-mail server 5 transmits the e-mail c6 to the e-mail receiving terminal 6 in the disaster area via the network gateway 4-2 (the state E. in FIG. 6).

Since in this exemplary embodiment, the function of converting voice data from the IP telephone terminal 1 in a non-disaster area into text data is thus disposed in the network, a message by e-mail can be transmitted to the e-mail receiving terminal 6 in the disaster area even if the IP telephone terminal 1 does not have a function of transmitting e-mail.

Figure 7:
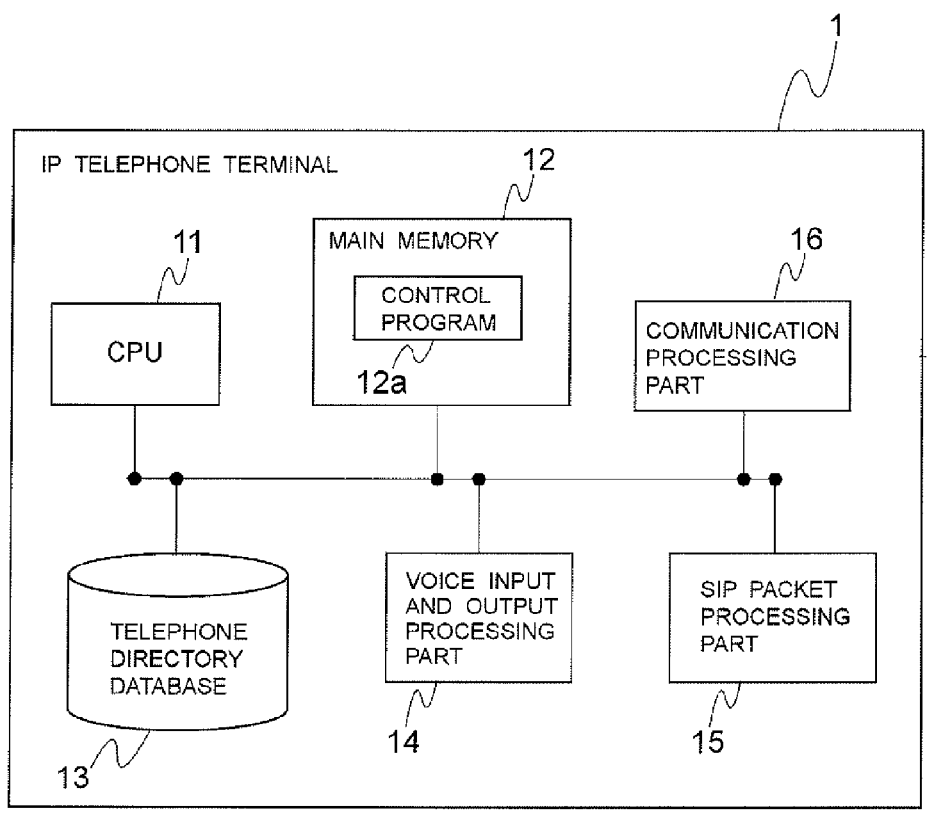
FIG. 7 is a block diagram showing an exemplary configuration of the IP telephone terminal shown in FIGS. 2 to 6.
Figure 8:
FIG. 8 is a diagram showing an exemplary configuration of the telephone directory database shown in FIG. 7.

FIG. 7 is a block diagram showing an exemplary configuration of the IP telephone terminal 1 shown in FIGS. 2 to 6. FIG. 8 is a diagram showing an exemplary configuration of a telephone directory database shown in FIG. 7. In FIG. 7 the IP telephone terminal 1 includes a CPU (Central Processing Unit) 11, a main memory 12 storing a control program 12a to be executed by the CPU 11, the telephone directory database 13, a voice input and output processing part 14, an SIP packet processing part 15, and a communication processing part 16.

In the IP telephone terminal 1, the CPU 11 provides the IP telephone service for users by controlling the voice input and output processing part 14, the SIP packet processing part 15, and the communication processing part 16.

The CPU 11 makes the SIP packet processing part 15 and the communication processing part 16 transmit the SIP packet indicating the e-mail address instead of the telephone number of an opposite party using the information stored in the telephone directory database 13, when the transition to the disaster mode is instructed by the disaster notification server 3 or the transition to the disaster mode is instructed by a user's operation on occurrence of a disaster.

The telephone directory database 13, as shown in FIG. 8, stores specific telephone numbers and e-mail addresses in relation to each other for the disaster mode. Accordingly, the CPU 11 transmits the SIP packet indicating the e-mail address for the disaster mode.

Figure 9:
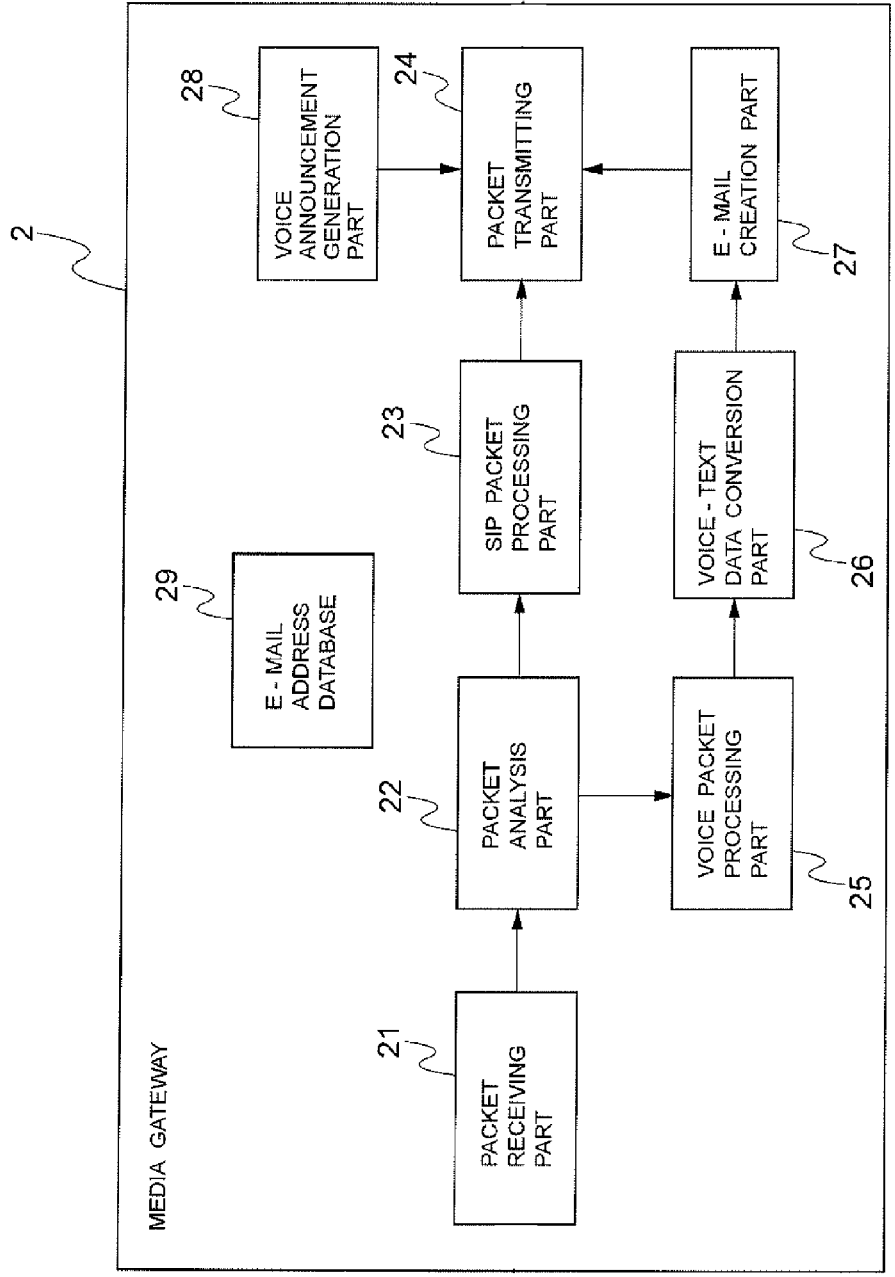
FIG. 9 is a block diagram showing an exemplary configuration of a media gateway shown in FIG. 2.

FIG. 9 is a block diagram showing an exemplary configuration of the media gateway 2 shown in FIG. 2. In FIG. 9, the media gateway 2 includes a packet receiving part 21, a packet analysis part 22, an SIP packet processing part 23, a packet transmitting part 24, a voice packet processing part 25, a voice-text data conversion part 26, an e-mail creation part 27, a voice announcement generation part 28, and a database 29.

In the media gateway 2, the packet receiving part 21 receives a packet, and subsequently the packet analysis part 22 analyzes the received packet. The packet analysis part 22 distinguishes whether the received packet is an SIP packet or a voice packet, and in the case of an SIP packet transmits the SIP packet to the SIP packet processing part 23, and in the case of a voice packet transmits the packet to the voice packet processing part 25.

The SIP packet processing part 23 analyzes the received SIP packet, extracts a destination e-mail address from an SDP (Session Description Protocol) description document in the case of calling information, and constructs the database 29 relating the extracted e-mail address to the IP address of the IP telephone terminal 1. Furthermore, the SIP packet processing part 23 creates an SIP response, and makes the packet transmitting part 24 transmit the SIP response, thereby establishing a call with the IP telephone terminal 1.

The voice announcement generation part 28 generates a voice announcement after the call with the IP telephone terminal 1 is established, and causes the packet transmitting part 24 to transmit the voice announcement to the IP telephone terminal 1.

The voice packet processing part 25 extracts the voice data from the received voice packet, and passes the voice data to the voice-text data conversion part 26. The voice-text data conversion part 26 converts the voice data into text data.

The e-mail creation part 27 creates an e-mail based on the text data converted by the voice-text data conversion part 26 and the information stored in the database 29, and causes the packet transmitting part 24 to transmit the created e-mail to the e-mail server 5.

The e-mail server 5 receives the e-mail created in the media gateway 2 as described above, and then distributes the e-mail to the e-mail receiving terminal 6 via the network gateway 4-2.

Figure 10:
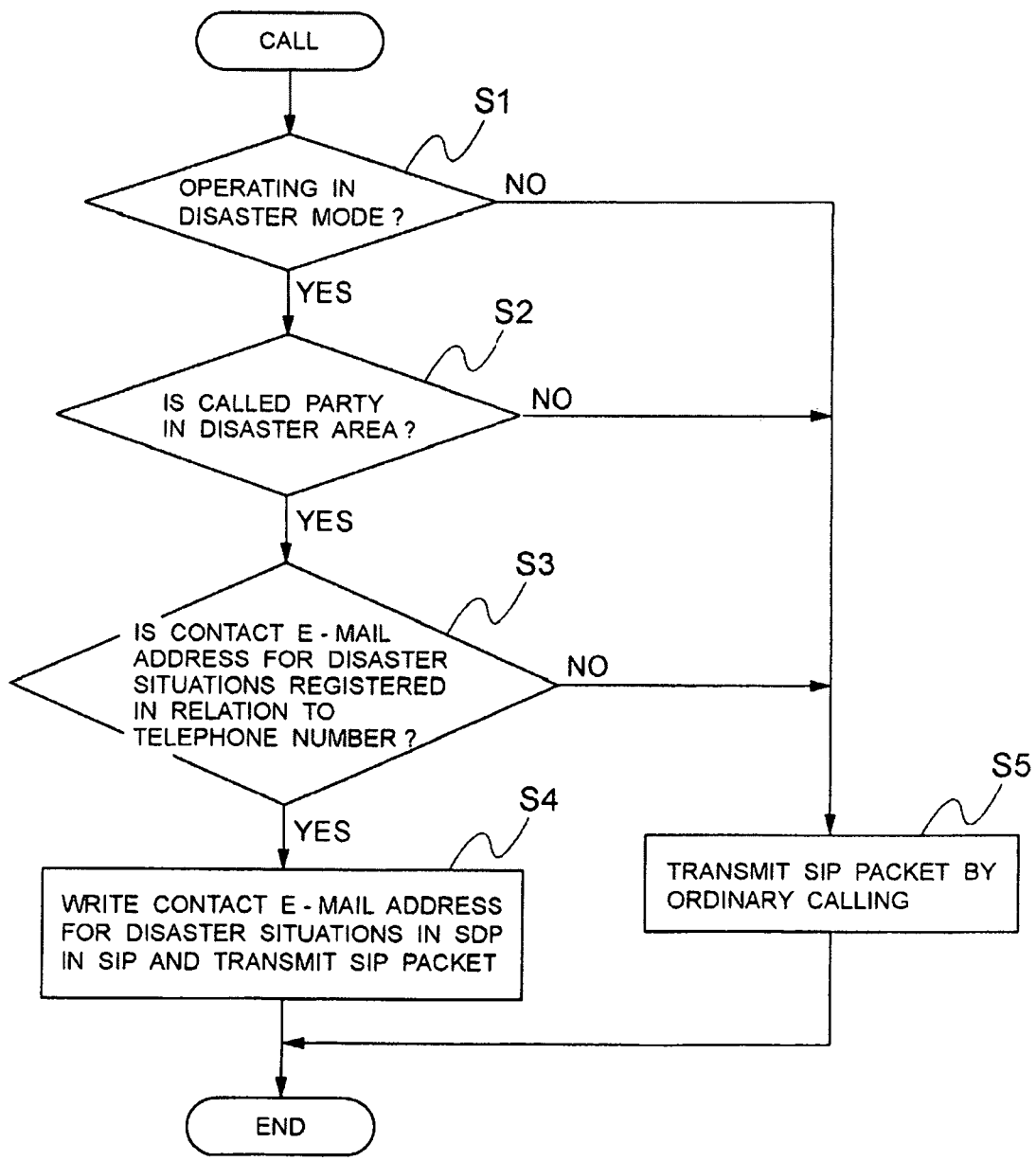
FIG. 10 is a flowchart showing an operation of the IP telephone terminal shown in FIG. 2.
Figure 11:
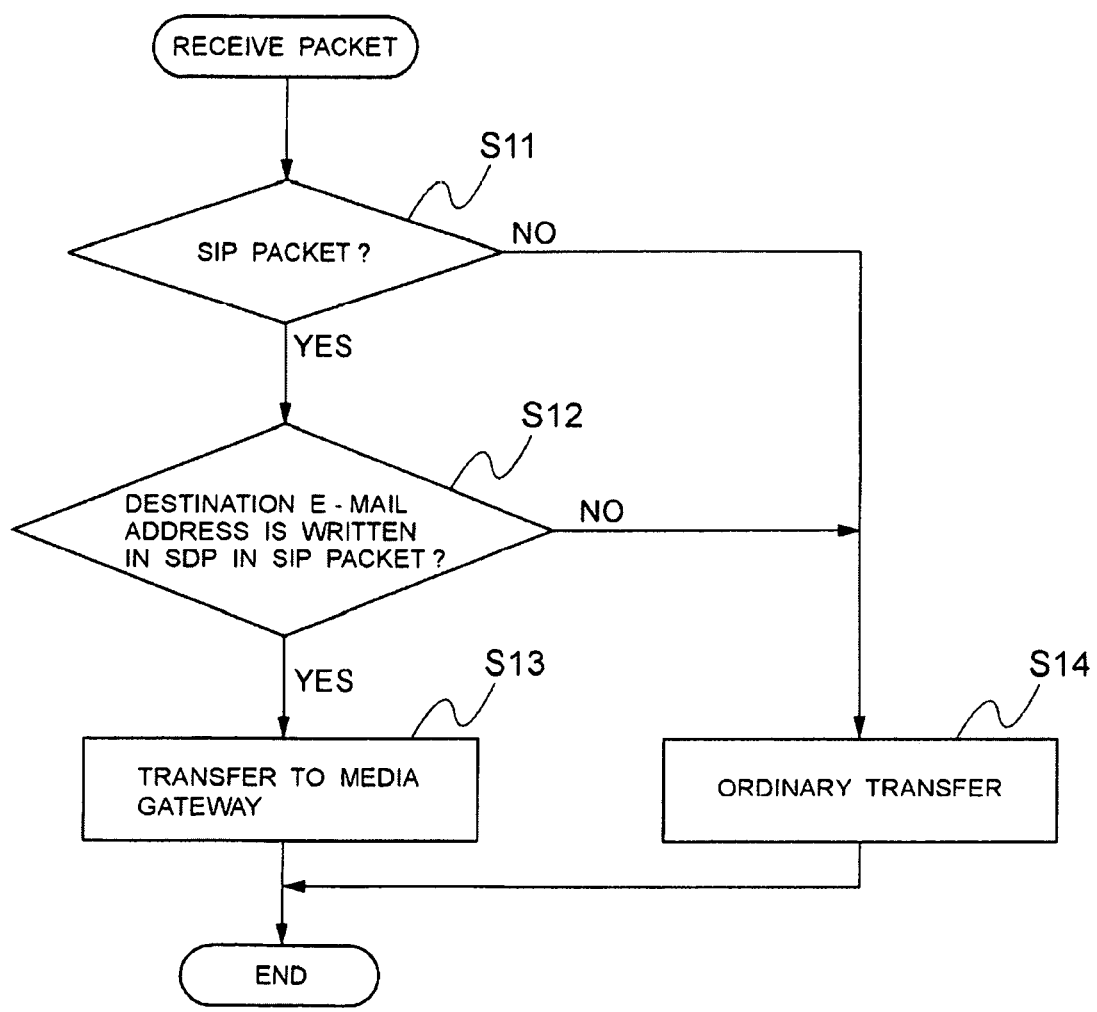
FIG. 11 is a flowchart showing an operation of the network gateway shown in FIG. 2.
Figure 12:
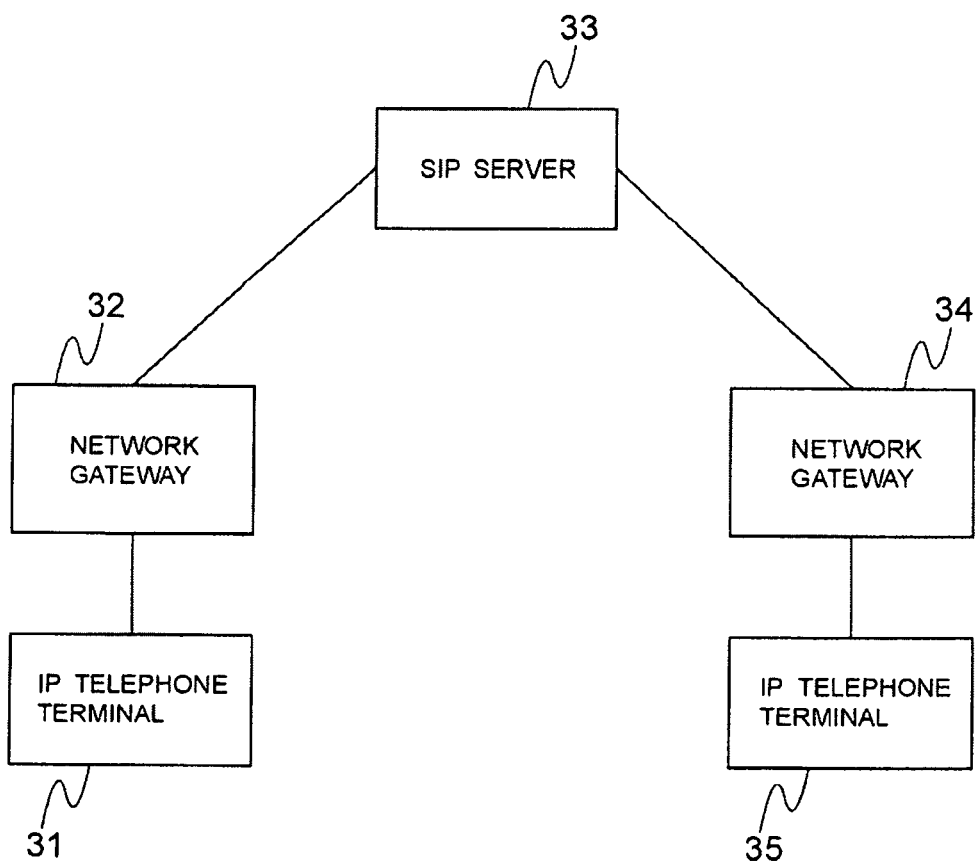
FIG. 12 is a block diagram showing an exemplary configuration of an IP telephone system related to the invention.

FIG. 10 is a flowchart showing an operation of the IP telephone terminal 1 shown in FIG. 2. FIG. 11 is a flowchart showing an operation of the network gateway 4-1 shown in FIG. 2. The operation of the IP telephone system according to the first exemplary embodiment of the invention will be described with reference to FIGS. 2 to 11.

The processing shown in FIG. 10 is actualized by the control program 12a being executed by the CPU 11 of the IP telephone terminal 1. The processing shown in FIG. 11 is actualized by a control program being executed by a CPU (not shown) of the network gateway 4-1, as with the processing of the IP telephone terminal 1. Furthermore, the IP telephone terminal 1 includes the telephone directory database 13 including data for disaster situations as shown in FIG. 8.

When a disaster strikes, the disaster notification server 3 transmits the instruction for transition to a disaster mode c1 to the IP telephone terminal 1 via the network gateway 4-1 in order to designate local numbers in the disaster area as targets for call regulation (the state A in FIG. 2). The IP telephone terminal 1 receives the instruction for transition to a disaster mode c1 from the disaster notification server 3, and then puts itself into the disaster mode.

When the IP telephone terminal 1 in the disaster mode transmits to the disaster area, the terminal 1 specifies the e-mail address in the SDP description document in an SIP packet by retrieving information in the telephone directory database 13 shown, in FIG. 8, creates the SIP packet c2, and transmits the SIP packet to the network gateway 4-1.

When the network gateway 4-1 receives the SIP packet c2 from the IP telephone terminal 1, the network gateway 4-1 transmits the SIP packet c2 to the media gateway 2 (the state B in FIG. 3), instead of transmitting to an originally destined SIP server (not shown)

The media gateway 2 terminates the SIP packet c2 from the network gateway 4-1, and transmits the SIP response c3 to the IP telephone terminal 1 in order to establish a call with the IP telephone terminal 1. At this time, the media gateway 2 analyzes the SIP packet, and constructs the database 29 relating the destination e-mail address to the IP address of the IP telephone terminal 1 (the state C in FIG. 4).

When the call with the IP telephone terminal 1 is established, the media gateway 2 transmits the voice announcement c4 to the IP telephone terminal 1 via the network gateway 4-1, thereby announcing to a user of the IP telephone terminal 1 that voice is automatically converted and transmitted by e-mail (the state D in FIG. 5).

The IP telephone terminal 1 receives the voice announcement c4 from the media gateway 2, and then transmits a message c5 to be conveyed as the RTP to the media gateway 2 (the state E in FIG. 6). The media gateway 2 receives the message c5, and then converts the voice data into text data, creates an e-mail c6 destined for the related e-mail address, and transmits the created e-mail to the e-mail server 5.

The e-mail server 5 transmits the e-mail c6 to the network gateway 4-2 in the disaster area. The network gateway 4-2 transmits the received e-mail c6 to the e-mail receiving terminal 6 (the state E in FIG. 6).

As described above, according to this exemplary embodiment, the e-mail receiving terminal 6 receives the e-mail, thereby enabling the IP telephone terminal 1 to be provided with means of communication by e-mail even under restriction on communication in disaster situations.

Next, the operation of the IP telephone terminal 1 in the non-disaster area will be described with reference to the FIG. 10. The IP telephone terminal 1 confirms whether it operates in the disaster mode or not when calling (the step S1 in FIG. 10). When the IP telephone terminal 1 operates in the disaster mode (YES at the branch of the step S1 in FIG. 10), the terminal 1 confirms whether the called party resides in the disaster area or not (the step S2 in FIG. 10).

When the called party resides in the disaster area (YES at the branch of the step S2 in FIG. 10), the IP telephone terminal 1 confirms whether or not the contact e-mail address for disaster situations is registered in relation to the telephone number of the called party with reference to the telephone directory database 13 (the step S3 in FIG. 10).

When the contact e-mail address for disaster situations is registered in the telephone directory database 13 (YES at the branch of the step S3 in FIG. 10), the IP telephone terminal 1 writes the contact e-mail address for disaster situations in the SDP description document in the calling SIP packet, and transmits the packet (the step S4 in FIG. 10).

When each branch is NO in the processing in the steps S1 to S3, the IP telephone terminal 1 transmits the SIP packet by ordinary calling (the step S5 in FIG. 10).

The operation when the network gateway 4-1 receives the SIP packet transmitted in the step S4 will subsequently be described with reference to FIG. 11.

When the network gateway 4-1 receives the packet, the network gateway 4-1 analyzes the packet and confirms whether the received packet is the SIP packet or not (the step 11 in FIG. 11).

When the received packet is the SIP packet (YES at the branch of the step S11 in FIG. 11), the network gateway 4-1 analyzes the SIP packet and confirms whether or not the destination e-mail address is written in the SDP description document (the step 12 in FIG. 11).

When the destination e-mail address is written in the SDP description document in the SIP packet (YES at the branch of the step S12 in FIG. 11), the network gateway 4-1 transfers the SIP packet to the media gateway 2 (the step 13 in FIG. 11).

On the other hand, when the received packet is not an SIP packet (NO at the branch of the step S11 in FIG. 11) or the destination e-mail address is not written in the SDP description document in the SIP packet (NO at the branch of the step S12 in FIG. 11), the network gateway 4-1 ordinarily transfers the SIP packet (the step S14 in FIG. 11).

As described above, according to this exemplary embodiment, the call from the IP telephone terminal 1 in the non-disaster area to the disaster area is made via the media gateway 2 instead of the SIP server, thereby allowing communication by e-mail with the terminal in the disaster area (the e-mail receiving terminal 6) even in a state where ordinary calls are congested in the SIP server.

Furthermore, according to this exemplary embodiment, the media gateway 2 disposed in the network side includes the function of converting the voice data into text data, thereby allowing communication by e-mail with the terminal in the disaster area (the e-mail receiving terminal 6) even if the IP telephone terminal 1 does not include the function of transmitting e-mail.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An IP (Internet Protocol) telephone system comprising an IP telephone terminal communicating with an opposite party using SIP (Session Initiation Protocol), and a network device transferring a packet from the IP telephone terminal, wherein the IP telephone terminal comprises a CPU (Central Processing Unit) transmitting an SIP packet indicating an e-mail address related to a telephone number of the opposite party when the terminal resides in a non-disaster area and calls the opposite party in a disaster area with a disaster mode being set, and the network device comprises an SIP packet processing part terminating an SIP packet whose destination is an e-mail address, an e-mail creation part converting a voice packet of RTP (Real Time Protocol) from the IP telephone terminal into text data and creating an e-mail, and a packet transmitting part transmitting the e-mail to the opposite party, wherein the network device is a media gateway, wherein the IP telephone system further comprises a first network gateway and a second network gateway, wherein the first network gateway transmits the SIP packet whose destination is an e-mail address to the second network gateway through the media gateway and an e-mail server, in a non-disaster situation, wherein the first network gateway transmits the SIP packet directly to the second network gateway without using the media gateway and the e-mail server, in a disaster situation.

2. The IP telephone system according to claim 1, wherein the IP telephone terminal comprises a telephone directory database, and a contact e-mail address for disaster situations is registered in relation to the telephone number of the opposite party in the telephone directory database.

3. The IP telephone system according to claim 1, further comprising:

a disaster notification server putting the IP telephone terminal into the disaster mode by notifying the IP telephone terminal in the non-disaster area of an instruction for transition to a disaster mode on occurrence of a disaster.

4. A network device transferring a packet from an IP (Internet Protocol) telephone terminal of an IP telephone system communicating with an opposite party using SIP (Session Initiation Protocol), comprising:
- an SIP packet processing part terminating an SIP packet whose destination is an e-mail address;
- an e-mail creation part converting a voice packet of RTP (Real Time Protocol) from the IP telephone terminal into text data and creating an e-mail when the IP telephone terminal resides in a non-disaster area and a disaster mode is set; and
- a packet transmitting part transmitting the e-mail to the opposite party,
- wherein the network device is a media gateway,
- wherein the IP telephone system further comprises a first network gateway and a second network gateway,
- wherein the first network gateway transmits the SIP packet whose destination is an e-mail address to the second network gateway through the media gateway and an e-mail server, in a non-disaster situation,
- wherein the first network gateway transmits the SIP packet directly to the second network gateway without using the media gateway and the e-mail server, in a disaster situation.

5. A communication method in disaster situations used for an IP (Internet Protocol) telephone system comprising an IP telephone terminal communicating with an opposite party using SIP (Session Initiation Protocol), and a network device transferring a packet from the IP telephone terminal within an IP telephone system, wherein
- the IP telephone terminal transmits an SIP packet indicating an e-mail address related to a telephone number of the opposite party when the terminal resides in a non-disaster area and calls the opposite party in a disaster area with a disaster mode being set, and
- the network device terminates an SIP packet whose destination is an e-mail address, converts a voice packet of RTP (Real Time Protocol) from the IP telephone terminal into text data and creating an e-mail, and transmits the e-mail to the opposite party,
- wherein the network device is a media gateway,
- wherein the IP telephone system further comprises a first network gateway and a second network gateway,
- wherein the first network gateway transmits the SIP packet whose destination is an e-mail address to the second network gateway through the media gateway and an e-mail server, in a non-disaster situation,
- wherein the first network gateway transmits the SIP packet directly to the second network gateway without using the media gateway and the e-mail server, in a disaster situation.

6. The communication method in disaster situations according to claim 5, wherein the method
- provides the IP telephone terminal with a telephone directory database, and
- registers a contact e-mail address for disaster situations in relation to the telephone number of the opposite party in the telephone directory database.

7. The communication method in disaster situations according to claim 5, wherein
- a disaster notification server puts the IP telephone terminal into the disaster mode by notifying the IP telephone terminal in the non-disaster area of an instruction for transition to a disaster mode on occurrence of a disaster.

8. An IP (Internet Protocol) telephone terminal communicating with an opposite party using SIP (Session Initiation Protocol) within an IP telephone system, comprising
- a CPU (Central Processing Unit) transmitting to a network device an SIP packet indicating an e-mail address related to a telephone number of the opposite party when the terminal resides in a non-disaster area and calls the opposite party in a disaster area with a disaster mode being set, wherein
- in the network device, a voice packet from the terminal is converted into text data and an e-mail is created, and the e-mail is transferred to the e-mail address,
- wherein the network device is a media gateway,
- wherein the IP telephone system further comprises a first network gateway and a second network gateway,
- wherein the first network gateway transmits the SIP packet whose destination is an e-mail address to the second network gateway through the media gateway and an e-mail server, in a non-disaster situation,
- wherein the first network gateway transmits the SIP packet directly to the second network gateway without using the media gateway and the e-mail server, in a disaster situation.

9. An IP (Internet Protocol) telephone system comprising an IP telephone terminal communicating with an opposite party using SIP (Session Initiation Protocol), and a network device transferring a packet from the IP telephone terminal, wherein
- the IP telephone terminal comprises control means of transmitting an SIP packet indicating an e-mail address related to a telephone number of the opposite party when the terminal resides in a non-disaster area and calls the opposite party in a disaster area with a disaster mode being set, and
- the network device comprises SIP packet processing means of terminating an SIP packet whose destination is an e-mail address, e-mail creation means of converting a voice packet of RTP (Real Time Protocol) from the IP telephone terminal into text data and creating an e-mail, and packet transmitting means of transmitting the e-mail to the opposite party,
- wherein the network device is a media gateway,
- wherein the IP telephone system further comprises a first network gateway and a second network gateway,
- wherein the first network gateway transmits the SIP packet whose destination is an e-mail address to the second network gateway through the media gateway and an e-mail server, in a non-disaster situation,
- wherein the first network gateway transmits the SIP packet directly to the second network gateway without using the media gateway and the e-mail server, in a disaster situation.

10. A network device transferring a packet from an IP (Internet Protocol) telephone terminal of an IP telephone system communicating with an opposite party using SIP (Session Initiation Protocol), comprising:
- SIP packet processing means of terminating an SIP packet whose destination is an e-mail address;
- e-mail creation means of converting a voice packet of RTP (Real Time Protocol) from the IP telephone terminal into text data and creating an e-mail when the IP telephone terminal resides in a non-disaster area and a disaster mode is set; and
- packet transmitting means of transmitting the e-mail to the opposite party,
- wherein the network device is a media gateway,
- wherein the IP telephone system further comprises a first network gateway and a second network gateway,
- wherein the first network gateway transmits the SIP packet whose destination is an e-mail address to the second network gateway through the media gateway and an e-mail server, in a non-disaster situation, wherein the first network gateway transmits the SIP packet directly to the second network gateway without using the media gateway and the e-mail server, in a disaster situation.

* * * * *